United States Patent [19]
Rodgers

[11] Patent Number: 5,502,611
[45] Date of Patent: Mar. 26, 1996

[54] CIRCUIT FOR PROVIDING PHASE LOSS AND PHASE IMBALANCE PROTECTION

[75] Inventor: Barry Rodgers, Raleigh, N.C.

[73] Assignee: Square D Company, Palatine, Ill.

[21] Appl. No.: 323,407

[22] Filed: Oct. 14, 1994

[51] Int. Cl.[6] ................................................... H02H 3/46
[52] U.S. Cl. ............................................. 361/85; 361/113
[58] Field of Search ................................. 361/85, 113, 87

[56] References Cited

U.S. PATENT DOCUMENTS

| | | | |
|---|---|---|---|
| 4,409,636 | 10/1983 | Brandt et al. | 361/87 |
| 4,698,718 | 10/1987 | Chow et al. | 361/77 |
| 5,319,513 | 6/1994 | Lewenstein | 361/113 |

Primary Examiner—Todd Deboer
Attorney, Agent, or Firm—Larry I. Golden; David Russell Stacey; Larry T. Shrout

[57] ABSTRACT

A circuit for detecting phase imbalance in a three phase electrical system. The circuit includes a three phase current transformer or three separate current transformers for monitoring the current flowing in each phase of a three phase electrical system. The current transformers provide an induced current proportional to the monitored current. The induced current passes through a full-wave bridge rectifier which produces a voltage output proportional to the induced current. This voltage signal is passed to a two pole Sallen-Key filter which allows a desired signal having a particular frequency range to pass through and blocks the passage of an undesired signal having a particular frequency range. A scaling circuit then receives a portion of the desired signal and produces a scaled average signal which is of a preselected magnitude lower than the desired signal. The scaled average signal and a portion of the desired signal are passed to a comparator/timer which produces an output signal based on a comparison of the desired signal and the scaled average signal. The output signal from the comparator/timer is only produced when the desired signal is lower in value than the scaled average signal and when the timer has determined that the signal is true. When it is determined that the output signal is true, it is sent to an electromechanical trip device which initiates a trip signal to an electrical contactor, thereby interrupting the three phase system.

1 Claim, 3 Drawing Sheets

CIRCUIT FOR PROVIDING PHASE LOSS AND PHASE IMBALANCE PROTECTION

FIELD OF THE INVENTION

The invention is related to the field of overload protection devices and in particular devices providing protection against the loss of a phase or a phase imbalance in a three phase electrical system.

BACKGROUND OF THE INVENTION

Many electrical devices such as motors are operated on a three phase electrical system. It is common to protect such devices with an overload relay which monitors current flowing in the three phase electrical system. When current supplied to the protected device is above a predetermined safe limit, the relay causes a contactor in series with the protected device to open. The loss of any one of the three phases of the electrical system can cause improper operation or significant damage to electrical the device. Therefore it is also desirable that the overload relay be capable of detecting a phase loss condition. A method of phase loss detection is disclosed by Reed et al. in U.S. Pat. No. 4,823,226, assigned to the present assignee and incorporated herein by reference. It is also known for the electrical phases to become unbalanced due to an overload or an underload condition in any one of the phases. The phase imbalance condition can have the same effect on electrical devices as the overload or phase loss conditions. Libert, in U.S. Pat. No. 4,724,503, assigned to the present assignee and incorporated herein by reference, discloses a method of phase loss and phase imbalance protection to be incorporated into a reduced voltage starter. The device of Libert senses the voltage waveform and compares the zero crossing point of each phase to determine phase loss and phase imbalance. The Libert device is a high end device which is significantly more complex than the current sensing low end device of Reed and thereby requires many more electrical components which increase the manufacturing cost. Any device such as Reed's which senses current flowing in the protected circuit is limited in its accuracy and ability to detect phase imbalance due to harmonically distorted current wave shapes which may be produced by starters such as a solid state reduced voltage starter running a motor in the economy mode. These harmonically distorted wave shapes appear to the overload relay as a phase loss condition and thereby cause nuisance tripping. In order to reduce the nuisance tripping, the percentage of imbalance allowed in such a system must be increased. This increases the chance that an overload or underload may be present in one phase of the system without causing the phase loss or unbalance detection circuits to initiate a trip condition. The National Electric Code 1993 (NEC) Article 430-34 Selection of Overload Relay requires that conductors supplying current to a motor be rated at 125% of the Motor Full Load Amperage (MFLA) per Articles 430–432 (a)(1) and (c)(1). Articles 430–434 also permit the current in the motor circuit to increase to 140% of MFLA during start up. It would therefore be desirable to have a phase unbalance detection circuit that is capable of detecting and initiating a trip when the phase unbalance in the system is greater 15% of the MFLA. It is also desirable to have this accurate phase unbalance detection circuit in a low end, low cost current sensing overload relay.

SUMMARY OF THE INVENTION

The present invention provides an inexpensive circuit for a low end current sensing overload relay which can accurately detect a phase imbalance condition in a three phase electrical system down to approximately 15% of the MFLA. Through empirical testing it has been found that the distorted harmonic frequencies produced by devices such as a reduced voltage starter running in the economy mode are at approximately six times the fundamental frequency of the system. Therefore in a 60Hz system these distorted harmonic frequencies would be in the range of 360Hz. It has also been found through empirical testing that phase imbalance and phase loss are usually detected at two times the fundamental frequency, or 120Hz in a 60Hz system. Therefore the present invention incorporates a two pole Sallen-Key filter with a cutoff of 126Hz located between a scaling stage and a phase imbalance detection stage of the overload relay. The cutoff frequency of the Sallen-Key filter should be chosen such that it which will pass a signal slightly higher than two times the fundamental frequency while blocking all signals having a frequency above the cutoff frequency. The Sallen-Key filter requires few components and therefore adds little to the manufacturing cost of the device. In the embodiment disclosed, the Sallen-Key filter includes one cell of an integrated circuit, 3 resistors and 2 capacitors. The circuit compares the an instantaneous signal value with a scaled average of the same signal to determine phase imbalance in the three phase system. When an imbalance occurs, the instantaneous signal value output from the Sallen-Key filtered stage will drop below a scaled average output from the Sallen-Key filter. By setting the scaled average circuit to 75% of the average value of the signal from the Sallen-Key filter, the overload relay will allow current imbalances in the motor circuit of about 15% without causing a nuisance trip. The value of the scaled average circuit is determined by selecting the values of resistors in a voltage divider and a capacitor in the scaling circuit.

Other features and advantages of the invention will become apparent to those skilled in the art upon review of the following detailed description, claims and drawings.

Figure 1:
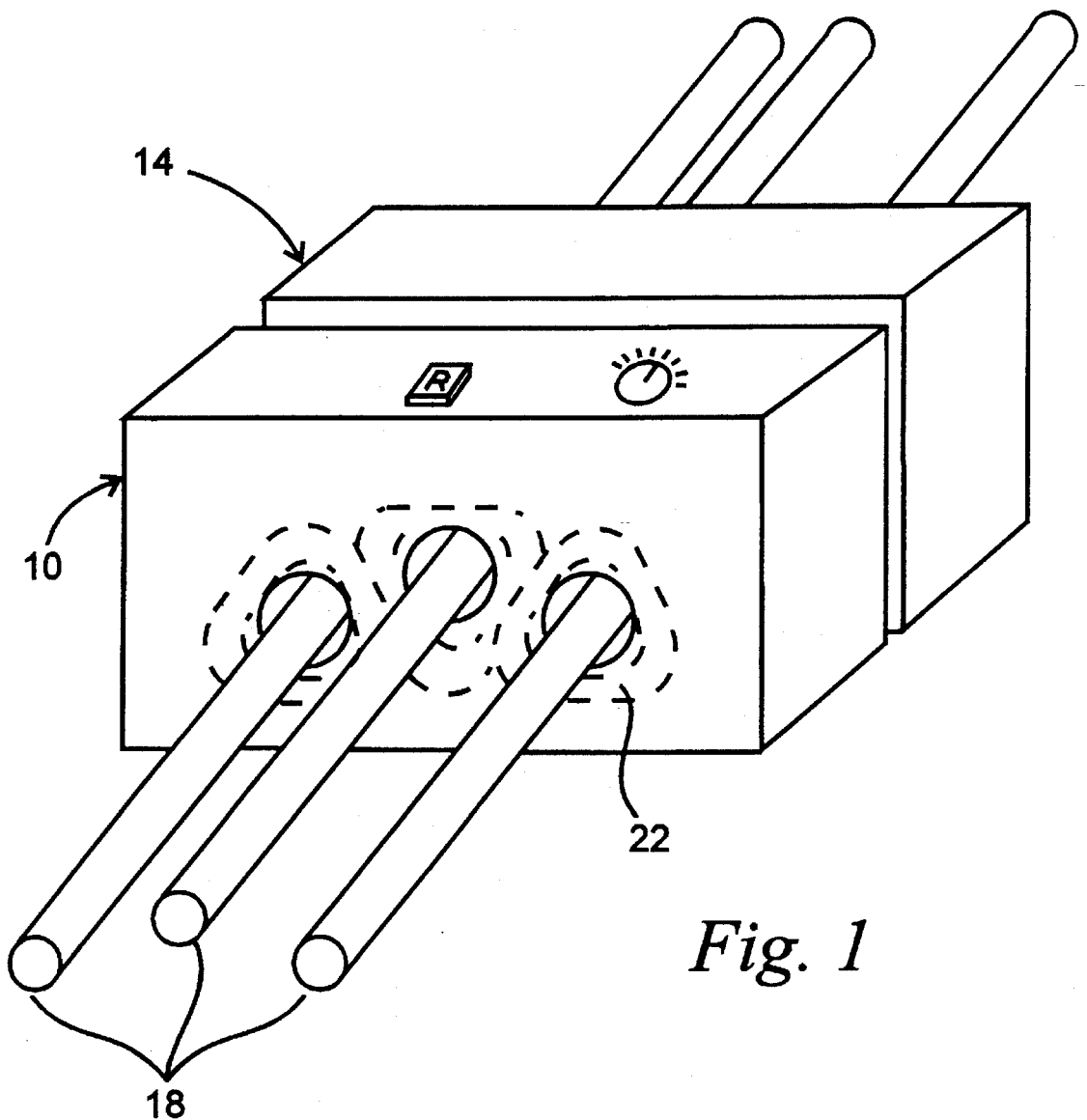
FIG. 1 is a schematic illustration of a typical overload relay and contactor system in accordance with the present invention.
Figure 2:
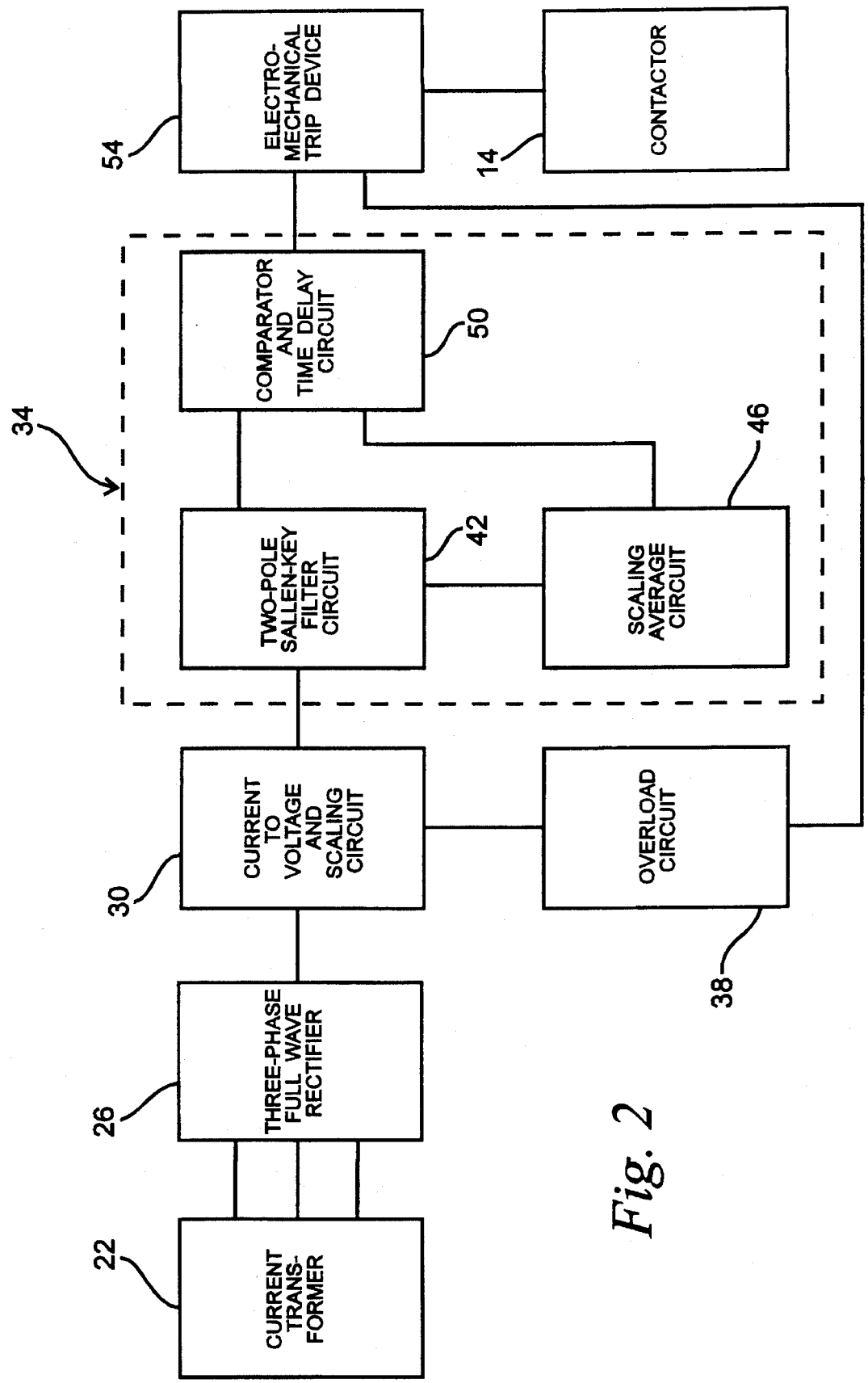
FIG. 2 is a block diagram of the phase loss/phase imbalance protection circuits in accordance with the present invention.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates an overload relay 10 and electrical contactor 14 in accordance with the present invention. The conductors 18 supply three phase current to a protected electrical device such as a motor. The contactor 14 is connected in series with the conductors 18 such that a signal from the overload relay 10 will cause the contactor 14 to open and thereby stop current flow to the protected electrical device. The overload relay 10 consists of a current transformer 22 for each phase of the three phases electrical current. Each current transformer 22 monitors the current flow of the conductor 18 passing through it and produces an induced current proportional to that current flowing in the conductor 18. The induced current is passed to a full wave bridge rectifier 26 which produces a DC output signal. The DC output signal from the rectifier 26 passes to a current to voltage converter and scaling circuit 30 which produces a voltage signal proportional to the induced current of the current transformers 22. This signal is scaled to a desired trip level before being passed to a phase loss/phase imbalance detection circuit generally indicated by reference numeral 34 and an overload circuit generally indicated by reference numeral 38. The phase loss/phase imbalance detection circuit 34 includes a two pole Sallen-Key filter 42, a scaling circuit 46 and a comparator/timer 50. The output signal from the current to voltage converter and scaling circuit 30 passes first into the two pole Sallen-Key filter 42 which allows a desired signal having a particular frequency range to pass through and blocks the passage of undesired signals having a particular frequency range. A portion of the desired signal is passed to the scaling circuit 46 which produces a scaled average signal which is of a lower magnitude than the desired signal. The comparator/timer 50 receives both the desired signal from the two pole Sallen-Key filter 42 and the scaled average signal from the scaling circuit 46. The signals are compared by the comparator/timer 50 which produces an output signal only when the desired signal is lower that the scaled average signal indicating a phase imbalance and a time period of approximately 1 ½ seconds. The output signal from the comparator/timer 50 passes to an electromechanical trip mechanism 54 which in turn sends a trip signal to the contactor 14 causing it to open and thereby interrupt current to the protected device. A signal from the overload circuit 38 is ORed with the output signal from the comparator/timer 50 such that either may cause the electromechanical trip mechanism 54 to initiate a trip signal to the contactor 14.

Figure 3:
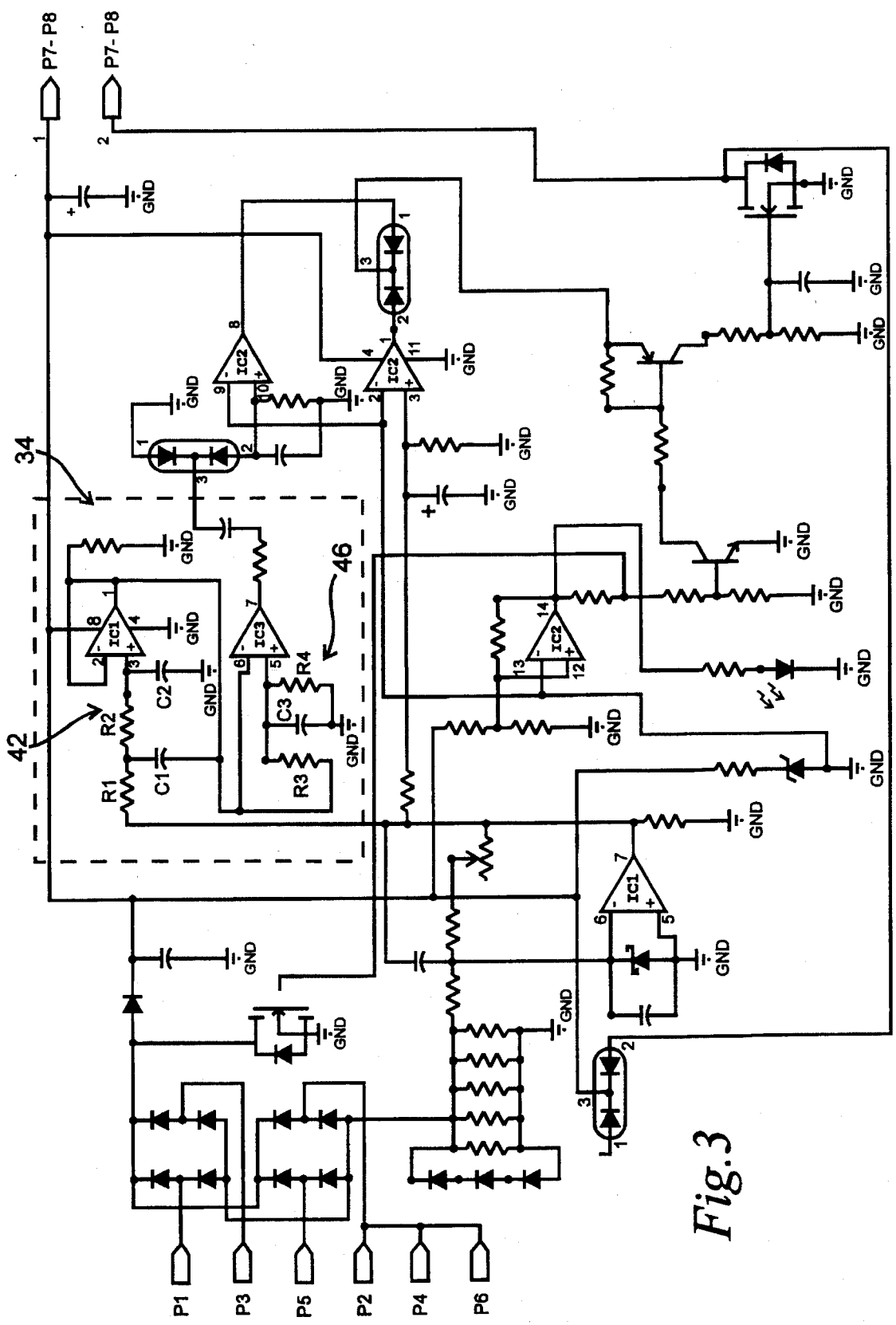
FIG. 3 is detailed circuit diagram of the phase loss and phase imbalance protection circuits.

FIG. 3 illustrates an overload relay circuit in accordance with the present invention. The two pole Sallen-Key filter 42 includes resistors R1 and R2, capacitors C1 and C2 and a portion of integrated circuit IC1. In this embodiment, the following values have been chosen: R1=309KΩ, R2=200KΩ, C1=0.01 μF and C2=20PF. These values allow signals of approximately 126Hz and less to pass and block signals greater than 126Hz. The scaling circuit 46 includes resistors R3 and R4 and capacitor C3. In this embodiment the following values have been chosen: R3=309KΩ, R4=100KΩ and C3=1 μF. These values lower the desired signal value by approximately 25%, thereby producing the scaled average signal.

I claim:

1. A circuit for detecting phase imbalance in a three phase electrical system, said circuit comprising;

a plurality of current transformers, each monitoring a current flowing in one phase of the three phase system and providing an induced current proportional to said monitored current;

a full wave bridge rectifier for rectifying said induced current produced by said current transformers;

a current to voltage converter for producing a voltage signal proportional to said induced current;

a two pole filter for receiving said signal from said current to voltage converter and selectively passing a desired signal having a particular frequency range or selectively blocking an undesired signal having a particular frequency range;

a scaling circuit for receiving a portion of said desired signal and producing therefrom a scaled average signal having a preselected magnitude lower than said desired signal;

a comparator/timer for receiving a portion of said desired signal and said scaled average signal and producing an output signal based on a comparison of said desired signal and said scaled average signal; and an electromechanical trip device for receiving said output signal and selectively initiating a trip signal to an electrical contactor for the purpose of interrupting said three phase system.

\* \* \* \* \*